United States Patent
Yoshida

(10) Patent No.: US 9,529,556 B2
(45) Date of Patent: Dec. 27, 2016

(54) INFORMATION PROCESSING APPARATUS, DATA PROCESSING METHOD, AND COMPUTER PROGRAM

(71) Applicant: CANON KABUSHIKI KAISHA, Tokyo (JP)

(72) Inventor: Toru Yoshida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/520,764

(22) Filed: Oct. 22, 2014

(65) Prior Publication Data

US 2015/0131110 A1 May 14, 2015

(30) Foreign Application Priority Data

Nov. 13, 2013 (JP) ................................ 2013-235075

(51) Int. Cl.
*G06F 3/12* (2006.01)
*H04N 1/40* (2006.01)
*H04N 1/00* (2006.01)

(52) U.S. Cl.
CPC ........... *G06F 3/1247* (2013.01); *G06F 3/1206* (2013.01); *G06F 3/128* (2013.01); *G06F 3/1285* (2013.01); *H04N 1/00222* (2013.01); *H04N 1/40068* (2013.01); *H04N 2201/0065* (2013.01); *H04N 2201/0094* (2013.01)

(58) Field of Classification Search
CPC ...... G06F 3/1247; G06F 3/1206; G06F 3/128; G06F 3/1285; H04N 1/00222; H04N 1/40068; H04N 2201/0065; H04N 2201/0094

See application file for complete search history.

(56) References Cited

U.S. PATENT DOCUMENTS

| | | | | |
|---|---|---|---|---|
| 2007/0266057 | A1* | 11/2007 | Utsumi | ............. G06F 17/30011 |
| 2010/0321718 | A1* | 12/2010 | Mihira | ............... H04N 1/00212 358/1.14 |
| 2013/0077130 | A1* | 3/2013 | Yoshida | ................. G06K 15/02 358/1.15 |

FOREIGN PATENT DOCUMENTS

JP  2013-073369 A  4/2013

\* cited by examiner

*Primary Examiner* — Iriana Cruz
(74) *Attorney, Agent, or Firm* — Carter, DeLuca, Farrell & Schmidt, LLP

(57) ABSTRACT

When document data cannot be printed and when it is necessary to convert a data format of the document data, a digital multi-function apparatus 110 requests a conversion of the data format to a data conversion apparatus 120. The data conversion apparatus 120 returns the document data after the data format was converted and data format information showing the data format before the conversion to the digital multi-function apparatus 110. The digital multi-function apparatus 110 executes a print processing when the data format identified by the received data format information is a data format of an application which can be printed by itself. If NO, the apparatus 110 does not execute the print processing.

15 Claims, 10 Drawing Sheets

FIG. 5

```
<?xml version="1.0" encoding="UTF-8"?>
<JobTicket version="1">
 <Job>
  <OrderId>
   <Value>222<Value>
  </OrderId>
   ···(abbr.)
  <InputData format="OOXML WORD">https://192.168.1.22/foo/input1.docx</InputData>
  <OutputData format="LIPS LX">https://192.168.1.22/foo/output1 </OutputData>
   ···(abbr.)
 </Job>
   ···(abbr.)
</JobTicket>
```

INFORMATION PROCESSING APPARATUS, DATA PROCESSING METHOD, AND COMPUTER PROGRAM

BACKGROUND OF THE INVENTION

Field of the Invention

The present invention relates to an information processing apparatus, a data processing method, and a computer program and, more particularly, the invention is suitable when it is used to convert document data so that a predetermined processing can be executed.

Description of the Related Art

In recent years, owing to the spread of information terminals such as smart phone, tablet PC (Personal Computer), and the like, such a request that data of various kinds of applications which are handled by those information terminals is printed by using an image processing apparatus such as a digital multi-function apparatus or the like is increasing. Also, owing to the spread of transportable storage media such as a USB memory and the like, such a request that data of an application stored in the transportable storage medium is printed by using an image processing apparatus such as a digital multi-function apparatus or the like is increasing.

Japanese Patent Application Laid-Open No. 2013-73369 discloses such a print control system that data received from an information terminal is converted into a data format which is printable by a data conversion apparatus, thereby enabling data of an application to be printed without using a printer driver.

However, according to Japanese Patent Application Laid-Open No. 2013-73369, in the case where the image processing apparatus cannot verify that the data of the application is the data of which kind of application, there is such a risk that whether or not the data should be subjected to a print processing cannot be determined. Thus, there is such a risk that a proper print-processing cannot be executed, for example, data which should not be inherently print-processed is print-processed, or the like. This is true of a processing which is executed to document data by an information processing apparatus other than the print processing.

SUMMARY OF THE INVENTION

The invention is made in consideration of the foregoing problems and it is an aspect of the invention that an information processing apparatus which cannot execute a predetermined processing can discriminate whether or not the predetermined processing may be executed to document data converted so that the predetermined processing can be executed.

According to an aspect of the invention, there is provided an information processing apparatus comprising: a first determining unit configured to determine as to whether document data can be subjected to a predetermined processing; a requesting unit configured to send, to an external apparatus, a conversion request to convert the document data into data which can be subjected to the predetermined processing, in response to a determining by the first determining unit such that the document data can be not subjected to the predetermined processing; a receiving unit configured to receive the data converted according to the conversion request sent from the requesting unit; and a second determining unit configured to determine as to whether the data converted can be subjected to the predetermined processing, based on information included in the data converted received by the receiving unit, the information identifying a format of the document data before the conversion.

Further features of the present invention will become apparent from the following description of exemplary embodiments with reference to the attached drawings.

BRIEF DESCRIPTION OF THE DRAWINGS

FIG. 3 is a diagram illustrating a construction of a data print application program and the like.

FIG. 5 is a diagram illustrating data format information.

FIG. 9 is a diagram illustrating a construction of a data print application program and the like.

DESCRIPTION OF THE EMBODIMENTS

Preferred embodiments of the present invention will now be described in detail in accordance with the accompanying drawings.

First, an example of subjects which are presumed by each embodiment of the invention will be described.

For example, such a situation that a license to permit a printing of application data formed by a document editing application is not given to an image processing apparatus will be presumed. Under such a situation, if the image processing apparatus cannot interpret the application data, the image processing apparatus requests a data conversion apparatus to convert a data format of the application data. The data conversion apparatus converts the application data into print data of a data format which can be interpreted by the image processing apparatus and transmits the converted print data to the image processing apparatus. Since the image processing apparatus can interpret the print data received from the data conversion apparatus, it can execute a print processing.

However, inherently, even if the application data formed by the document editing application could be interpreted, since the image processing apparatus does not have the license to print such application data, the print processing should not be executed. That is, in the case where information showing that a generating source of the application data is the document editing application is not described in the print data received from the data conversion apparatus, there is such a risk that the image processing apparatus cannot determine whether or not the application data should be properly subjected to the print processing.

An example of the subjects which are presumed by each embodiment of the invention has been described above. Each of the following embodiments of the invention is made to solve at least such a subject. Modes for embodying the invention will be described hereinbelow with reference to the drawings. In the following description, the application data formed by the document editing application is called "data", "application data", or "document data" in accordance with necessity.

(First Embodiment)

First, the first embodiment of the invention will be described.

Figure 1:
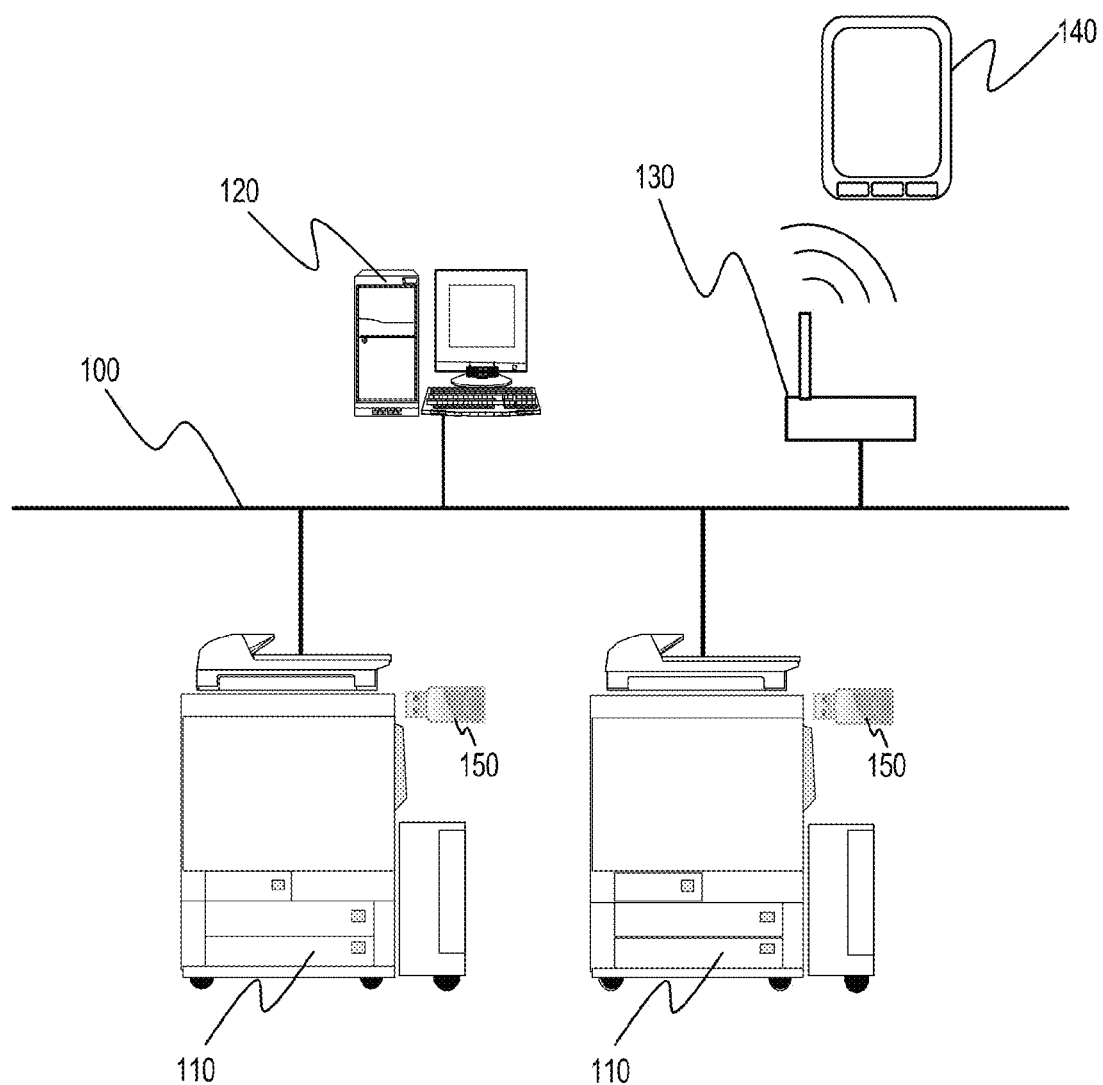
FIG. 1 is a diagram illustrating a construction of a print system.

FIG. 1 is a diagram illustrating an example of a whole construction of a print system.

In FIG. 1, a digital multi-function apparatus 110 and a data conversion apparatus 120 mutually communicate through a network 100. An information terminal 140 is connected to the network 100 through a wireless LAN router 130 and can mutually communicate with the digital multi-function apparatus 110. A USB (Universal Serial Bus) memory 150 can be connected to the digital multi-function apparatus 110. The digital multi-function apparatus 110 can read and write data stored in the connected USB memory 150.

The number of digital multi-function apparatus 110, data conversion apparatus 120, wireless LAN router 130, and information terminal 140 is not limited to the number illustrated in FIG. 1 but one or a plurality of those apparatuses may be connected.

When a print request is received from the information terminal 140 together with print target data, the digital multi-function apparatus 110 (information processing apparatus) determines whether or not the digital multi-function apparatus 110 can directly print the received data. If it is determined that the received data cannot be directly printed, the digital multi-function apparatus 110 requests the data conversion apparatus 120 (external apparatus) to convert (conversion request) the received data into a printable data format. The printable data format is, for example, a data format of PDL (Page Description Language).

The data conversion apparatus 120 determines the data format of the data received from the digital multi-function apparatus 110 and converts the received data into a data format which is requested by the digital multi-function apparatus 110. The determination of the data format which is made by the data conversion apparatus 120 can be performed by, for example, analyzing the contents of the data received from the digital multi-function apparatus 110. The digital multi-function apparatus 110 obtains the data whose data format has been converted from the data conversion apparatus 120 and executes a print processing.

Also in the case of printing data stored in the USB memory 150 loaded in the digital multi-function apparatus 110 instead of the data from the information terminal 140, the digital multi-function apparatus 110 executes a processing similar to that in the case of printing the data from the information terminal 140.

That is, in the case of printing the data stored in the USB memory 150, the digital multi-function apparatus 110 determines whether or not the digital multi-function apparatus 110 can directly print the data stored in the USB memory 150. If it is determined that the data stored in the USB memory 150 cannot be directly printed, the digital multi-function apparatus 110 sends a conversion request to convert the data stored in the USB memory 150 into a printable data format to the data conversion apparatus 120.

The data conversion apparatus 120 determines the data format of the data received from the digital multi-function apparatus 110 and converts the received data into the data format which is requested by the digital multi-function apparatus 110. The determination of the data format which is made by the data conversion apparatus 120 can be performed by, for example, analyzing the contents of the data received from the digital multi-function apparatus 110. The digital multi-function apparatus 110 obtains the data whose data format has been converted from the data conversion apparatus 120 and executes a print processing.

Although the embodiment will be described with respect to a case where the USB memory 150 is used as an example, another storage device may be used. For example, a storage medium such as an SD memory card or the like may be used. In such a case, it is sufficient that a transportable storage medium such as an SD memory card or the like is connected to the digital multi-function apparatus 110 through a card reader. A storage area of an information processing apparatus such as a PC (Personal Computer) or the like which can communicate with the digital multi-function apparatus 110 through the network 100 may be used.

Figure 2:
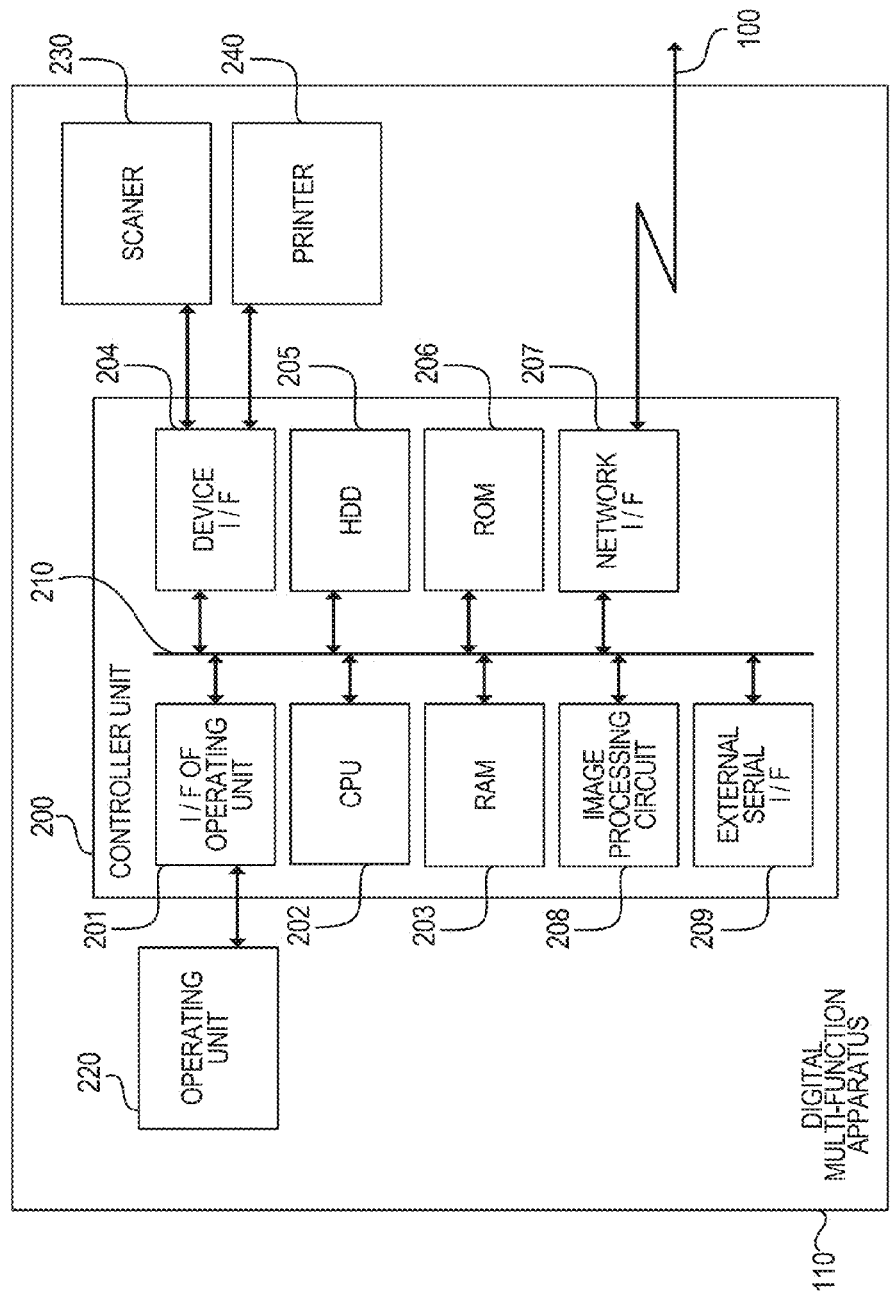
FIG. 2 is a diagram illustrating a construction of hardware of a digital multi-function apparatus.

FIG. 2 is a block diagram illustrating an example of a construction of hardware of the digital multi-function apparatus 110. The digital multi-function apparatus 110 includes a controller unit 200, an operating unit 220, a scanner 230, and a printer 240. The operating unit 220 is connected to the controller unit 200. The scanner 230 serving as an image input device and the printer 240 serving as an image output device are also connected to the controller unit 200.

The controller unit 200 has a CPU (Central Processing Unit) 202. The CPU 202 makes an OS (Operating System) operative by a boot program stored in a ROM (Read Only Memory) 206. On this OS, the controller unit 200 executes application programs stored in an HDD (Hard Disk Drive) 205, thereby executing various kinds of processings. A RAM (Random Access Memory) 203 is used as a work area of the CPU 202. The RAM 203 provides not only a work area but also an image memory area to temporarily store image data. The HDD 205 stores the application programs, image data, and the like.

Together with the ROM 206 and the RAM 203, an I/F 201 of the operating unit, a device I/F 204, a network I/F 207, an image processing circuit 208, and an external serial I/F 209 are connected to the CPU 202 through a system bus 210.

The I/F 201 of the operating unit is an interface with the operating unit 220 having a touch panel and outputs the image data to be displayed onto the operating unit 220 to the operating unit 220. The I/F 201 of the operating unit also transmits information which was input by the user in the operating unit 220 to the CPU 202. The scanner 230 serving and the printer 240 are connected to the device I/F 204. The device I/F 204 performs a conversion of a synchronous system/asynchronous system of the image data. The network I/F 207 is connected to the network 100. Through the network 100, the network I/F 207 inputs and outputs information from/to each apparatus connected to the network 100. The image processing circuit 208 executes: an input image processing to the data which was input from the scanner 230; an output image processing to the data which is output to the printer 240; and processings such as image rotation, image compression, resolution conversion, color space conversion, gradation conversion, and the like. The external serial I/F 209 is an interface with an external apparatus such as a USB memory 150 or the like. The controller unit 200 bidirectionally performs data communication with the external apparatus connected to the external serial I/F 209.

Figure 3:
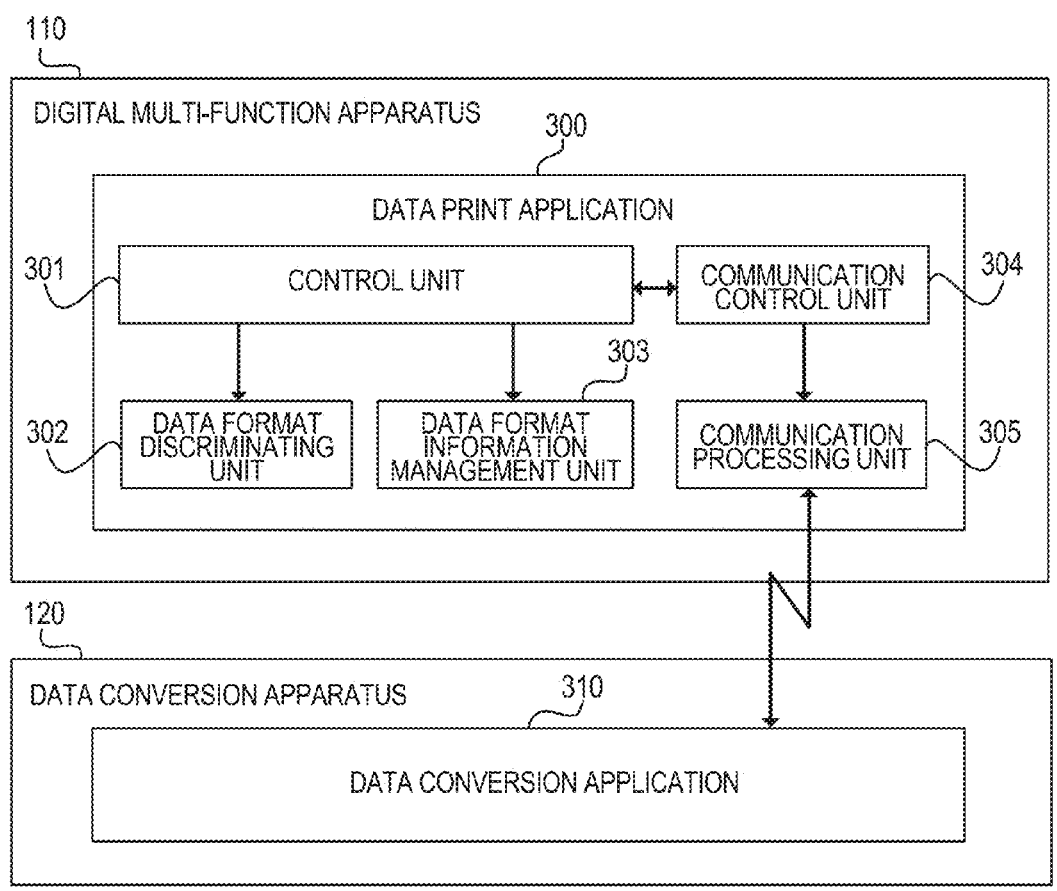

FIG. 3 is a block diagram illustrating an example of a functional construction of a data print application program which operates in the digital multi-function apparatus 110 and a data conversion application program which operates in the data conversion apparatus 120.

In FIG. 3, a data print application 300 has a control unit 301, a data format discriminating unit 302, a data format information management unit 303, a communication control unit 304, and a communication processing unit 305.

The control unit 301 controls a processing of each unit of the data print application 300. The data format discriminating unit 302 discriminates a data format. The data format information management unit 303 manages information of the data format which is printable by the digital multi-function apparatus 110. The communication control unit 304 controls communication with the data conversion apparatus 120. The communication processing unit 305 makes data communication through the network I/F 207.

The information of the data format which is managed by the data format information management unit 303 and is printable by the digital multi-function apparatus 110 is stored in the HDD 205, RAM 203, ROM 206, or the like. The communication control unit 304 instructs the communication processing unit 305 to communicate. On the basis of an instruction from the communication control unit 304, the communication processing unit 305 executes a processing such as encryption, compression/expansion, or the like of data which is communicated with the data conversion apparatus 120.

The data format discriminating unit 302 discriminates a data format of the data whose print request was received by the data print application 300. As a method of discriminating the data format, there are a method of discriminating from an extension of the data, a method of discriminating from print request information which is input at the time of requesting the printing, and a method of discriminating by analyzing a head portion of the data. In the case of printing the data stored in the USB memory 150, since information of the extension of the data can be obtained, the data format discriminating unit 302 discriminates the data format from the extension of the data. In the case of discriminating the data format of the data received from the information terminal 140 or the like through the network 100, the data format discriminating unit 302 makes the following discrimination. That is, the data format discriminating unit 302 discriminates whether or not the data format information (information which can identify the data format) exists in the print request information added to (or included in) the received data. If the data format information exists as a result of discrimination, the data format discriminating unit 302 discriminates the data format of the print data from the data format information. If the data format information does not exist, the data format discriminating unit 302 analyzes the contents of the received data and discriminates the data format of the print data.

There are the following three information in the information of the data format which is managed by the data format information management unit 303 and is printable by the digital multi-function apparatus 110. The first information is information of the data format which is directly processed and is printable by the digital multi-function apparatus 110. The second information is information of the data format which becomes printable by the digital multi-function apparatus 110 by converting the data format by the data conversion apparatus 120. The third information is information of the data format which is printable by the data conversion apparatus 120.

The data format which is directly processed and is printable by the digital multi-function apparatus 110 is, for example, a data format of PDL which can be processed by the digital multi-function apparatus 110.

The data format which becomes printable by the digital multi-function apparatus 110 by converting the data format by the data conversion apparatus 120 is, for example, the following data format. That is, it is a data format of an application which has been set as a software license to the digital multi-function apparatus 110 and is printable by the digital multi-function apparatus 110. With respect to data of a data format of an application whose software license is not set to the digital multi-function apparatus 110, the data print application 300 does not execute the print processing irrespective of the data format which can be processed by the data conversion apparatus 120.

The data format which can be processed by the data conversion apparatus 120 is, for example, a data format which can be processed by the data conversion apparatus 120 as a data format before the conversion and a data format which can be generated by the data conversion apparatus 120 by converting the data format.

The data print application 300 is stored in any one of the storage units such as RAM 203, HDD 205, and ROM 206 and is executed by the CPU 202.

A data conversion application 310 operates in the data conversion apparatus 120. The data conversion apparatus 120 receives a conversion request of data from the digital multi-function apparatus 110 and executes the conversion processing of the data format.

Figure 4:
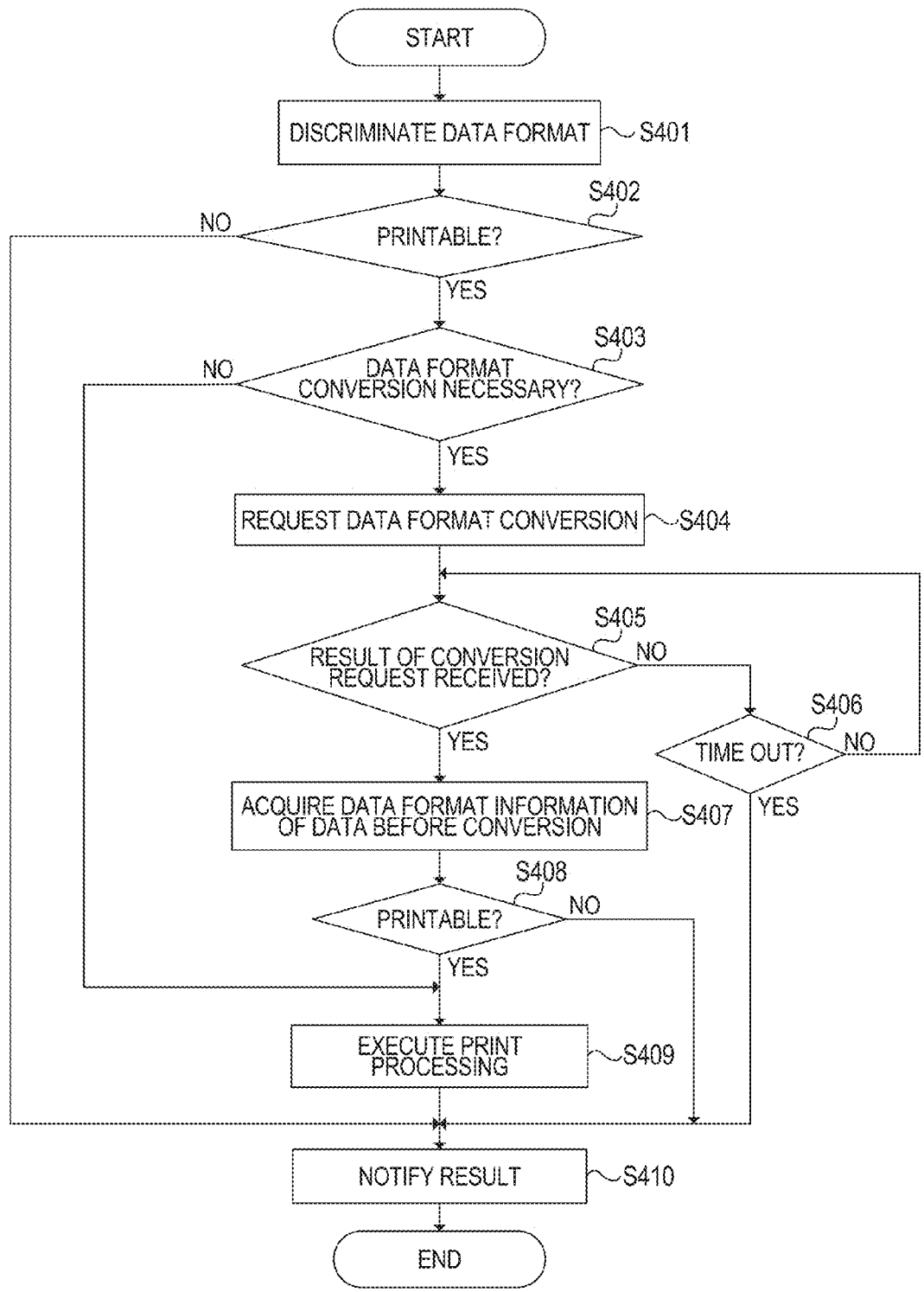
FIG. 4 is a flowchart for describing a first example of a processing at the time of printing data.

FIG. 4 is a flowchart for describing an example of a data processing at the time of printing the data of which the printing has been requested. The flowchart of FIG. 4 will be described with respect to an example of a case where the printing of the application data stored in the USB memory 150 has been instructed.

First, in step S401, when the data print application 300 receives the print request, the control unit 301 requests the data format discriminating unit 302 to discriminate the data format. The data format discriminating unit 302 discriminates the data format of the print-requested data (print-instructed data) from an extension of the print-requested data, print request information added to the print-requested data, or a head portion of the print-requested data. The data format of the application data stored in the USB memory 150 can be discriminated by the extension of the data stored in the USB memory 150. Therefore, the data format discriminating unit 302 discriminates that the data format is a data format of which application from the extension of the data stored in the USB memory 150.

Subsequently, in step S402, the control unit 301 obtains the information (the first to third information mentioned above) of the data format which is printable by the digital multi-function apparatus 110 from the data format information management unit 303. The control unit 301 makes a first determination to determine whether or not the data of the data format discriminated in step S401 can be printed. By using the foregoing first to third information obtained from the data format information management unit 303, the control unit 301 determines whether or not the data of the data format discriminated by the data format discriminating unit 302 in step S401 can be printed.

Specifically speaking, first, whether or not the data format discriminated in step S401 is a data format which is directly processed and is printable by the digital multi-function apparatus 110. As a result of the determination, if the data format discriminated in step S401 is the data format which is directly processed and is printable by the digital multi-function apparatus 110, it is determined that the data of the data format can be printed. If the data format discriminated in step S401 is not the data format which is directly processed and is printable by the digital multi-function apparatus 110, the following determination is made. That is, whether or not the data format discriminated in step S401 is included in the data format of the application which has been set as a software license to the digital multi-function apparatus 110. As a result of the determination, if the data format discriminated in step S401 is not included in the data format of the application which has been set as a software license to the digital multi-function apparatus 110, it is determined that the data cannot be printed. On the other hand, if the data format discriminated in step S401 is included in the data format of the application which has been set as a software license to the digital multi-function apparatus 110, the following determination is made. That is, whether or not the data format discriminated in step S401 is included in the data format which can be processed by the data conversion apparatus 120. As a result of the determination, if the data format discriminated in step S401 is included in the data format which can be processed by the data conversion apparatus 120, it is determined that the data of the data format can be printed. If NO, it is determined that the data of the data format cannot be printed.

As a result of the determination in step S402, if the data of the data format discriminated in step S401 cannot be printed, step S410 follows and the control unit 301 notifies that the data cannot be printed. The processing routine is finished.

As a result of the determination in step S402, if the data of the data format discriminated in step S401 can be printed, step S403 follows. In step S403, the control unit 301 makes a first determination to determine whether or not a conversion request of the data format to the data conversion apparatus 120 is necessary.

Specifically speaking, whether or not the data format discriminated in step S401 is included in the data format which was obtained from the data format information management unit 303 and which is directly processed and is printable by the digital multi-function apparatus 110. As a result of the determination, if the data format discriminated in step S401 is included in the data format which is directly processed and is printable by the digital multi-function apparatus 110, the control unit 301 determines that the conversion request of the data format is unnecessary, and step S409 follows. In step S409, the control unit 301 executes the print processing of the print-requested data.

On the other hand, if the data format discriminated in step S401 is not included in the data format which is directly processed and is printable by the digital multi-function apparatus 110, the control unit 301 determines that the conversion request of the data format is necessary, and step S404 follows.

In step S404, the communication control unit 304 sends the conversion request of the data format to the data conversion apparatus 120 through the communication processing unit 305 and the network 100. Specifically speaking, the communication control unit 304 specifies a module of the communication processing unit 305 corresponding to the data conversion apparatus 120 to which the conversion of the data format is requested and informs the apparatus of the contents of the conversion request of the data format. The communication processing unit 305 generates data to request the conversion of the data format to the data conversion apparatus 120 and transmits the generated data to the data conversion apparatus 120, thereby requesting the conversion processing of the data format to the data conversion apparatus 120.

Subsequently, in step S405, the communication control unit 304 determines whether or not a result to the conversion request of the data format has been received from the data conversion apparatus 120 through the communication processing unit 305 and the network 100. Specifically speaking, the communication processing unit 305 requests the data conversion apparatus 120 to obtain the result to the conversion request of the data format. The communication control unit 304 determines whether or not data including the data whose data format was converted and data format information showing the data format of the data before the conversion has been received as a result to the conversion request of the data format. The data format shown by the data format information is a data format identified in the data conversion apparatus 120.

If the result to the conversion request of the data format cannot be received as a result of the discrimination, step S406 follows and the communication control unit 304 discriminates whether or not a time-out has occurred. If the time-out has occurred as a result of the discrimination, step S410 follows and the control unit 301 notifies that the data cannot be printed, and the processing routine is finished.

If the time-out does not occur yet as a result of the discrimination of step S406, the processing routine is returned to step S405.

In step S406, the communication control unit 304 may make a determination in the case where the response from the data conversion apparatus 120 is an error as a result to the conversion request of the data format. If there is a response showing the data conversion error or the like from the data conversion apparatus 120 as a result to the conversion request of the data format, in step S406, the communication control unit 304 may determine that the processing cannot be continued, and may advance to step S410. If the processing routine advances to step S410 in this manner, the control unit 301 notifies that the data cannot be printed, and the processing routine is finished.

If the result to the conversion request of the data format is received as a result of the determination in step S405, step S407 follows. In step S407, the communication control unit 304 outputs data showing the result to the conversion request of the data format to the control unit 301. As mentioned above, the data whose data format has been converted and the data format information showing the data format of the data before the conversion are included in the data showing the result to the conversion request of the data format.

FIG. 5 is a diagram illustrating an example of the data format information included in the data showing the result to the conversion request of the data format.

The data conversion apparatus 120 discriminates that the format of the data before the data format is converted is data of which application. In the example illustrated in FIG. 5, a result of the discrimination (information showing that the format of the data before the data format is converted is data of which application) is shown in an InputData tag as data (data format information) showing the result to the conversion request of the data format.

The control unit 301 obtains the data format information showing the data format of the data before the conversion which was discriminated by the data conversion apparatus 120 as mentioned above.

Subsequently, in step S408, the control unit 301 makes a second determination to determine whether or not the data whose data format has been converted can be printed. If the data format obtained in step S407 is included in the data format of the application which was obtained from the data format information management unit 303 and was set as a software license to the digital multi-function apparatus 110, it is determined that the data can be printed. If the data format obtained in step S407 is not included in the data format of the application which was obtained from the data format information management unit 303 and was set as a software license to the digital multi-function apparatus 110, it is determined that the data cannot be printed.

If the data whose data format has been converted cannot be printed as a result of the determination, step S410 follows. The control unit 301 notifies that the data cannot be printed, and the processing routine is finished. When the processing routine advances from step S408 to step S410, the control unit 301 removes the data showing the result to the conversion request of the data format (data which was determined to have been received in step S405).

If the data whose data format has been converted can be printed, step S409 follows. The control unit 301 executes the print processing in the digital multi-function apparatus 110 by using the data whose data format has been converted by the data conversion apparatus 120. When the print processing is executed as mentioned above and step S410 follows, the control unit 301 notifies the apparatus of the print result. The processing routine is finished.

As mentioned above, in the embodiment, when the document data cannot be printed and the conversion of the data format of the document data is necessary, the digital multi-function apparatus 110 requests the conversion of the data format to the data conversion apparatus 120. The data conversion apparatus 120 returns the document data after the data format was converted and the data format information showing the data format before the conversion to the digital multi-function apparatus 110. When the data format identified by the received data format information is the data format of the application which is printable by itself, the digital multi-function apparatus 110 executes the print processing. If NO, the apparatus 110 does not execute the print processing. In this manner, not only before the conversion of the data format of the document data in the data conversion apparatus 120 but also after the data format of the document data was converted in the data conversion apparatus 120, the permission or inhibition of the printing is determined by using the data format discriminated in the data conversion apparatus 120. Therefore, for example, if an extension of a file of the print-requested document data is wrong, it is determined in the process in step S408 that the print processing cannot be executed, so that the permission or inhibition of execution of the printing can be correctly discriminated.

In the flowchart of FIG. 4, the case of printing the application data stored in the USB memory 150 has been described as an example. However, the data print application 300 can process even data other than the application data stored in the USB memory 150. For example, when the print request is received from the information terminal 140 through the network 100, it is sufficient that the data print application 300 stores the data received as a print request into the RAM 203 or HDD 205 and executes a processing similar to that shown in the flowchart of FIG. 4.

In step S401, the data format is discriminated by the extension on the assumption that there is an extension in the application data. However, if there is no extension, the processing may be executed on the assumption that the data format cannot be discriminated, or the data format may be discriminated from the print request information or a head portion of the print-requested data as mentioned above. The discriminating method of the data format in the data format discriminating unit 302 may be one of those methods or a method obtained by combining a plurality of methods.

When the data format cannot be discriminated in step S401, even if it is determined in step S402 that the data can be printed, it may be determined that the data cannot be printed.

Even when the data format cannot be discriminated in step S401, if it is determined in step S402 that the data can be printed, the processings after step S403 may be executed. For example, in the case where it is determined in step S402 that the data can be printed and it is determined in step S403 that the conversion of the data format is necessary, in step S404, the conversion of the data format is requested to the data conversion apparatus 120 in a state where the data format of the original data is obscure. That is, even when the data format cannot be discriminated in the digital multi-function apparatus 110, if the data format can be discriminated in the data conversion apparatus 120, the data of the data format which is printable in the digital multi-function apparatus 110 can be printed. For example, even in the case where the digital multi-function apparatus 110 received the data without the print request information from the information terminal 140 or the like, a discrimination logic is not provided for the digital multi-function apparatus 110 but only the data which may be printed in the digital multi-function apparatus 110 can be properly printed by the processing of the data conversion apparatus 120.

(Second Embodiment)

Subsequently, the second embodiment of the invention will be described. In the first embodiment, the data format of the application which has been set as a software license to the digital multi-function apparatus 110 and the data format (data format of the data before the conversion) received from the data conversion apparatus 120 are compared and whether or not the data can be printed is determined. On the other hand, in the second embodiment, the data format of the print-requested data and the data format of the data (which was received from the data conversion apparatus 120) before the data format is converted are compared and whether or not the data can be printed is determined. In this manner, in the first and second embodiments, the methods of determining whether or not the data whose data format has been converted can be printed differ mainly. Therefore, in the description of the embodiment, substantially the same portions as those in the first embodiment are designated by the same reference numerals as those in FIGS. 1 to 5 and their detailed description is omitted.

Figure 6:
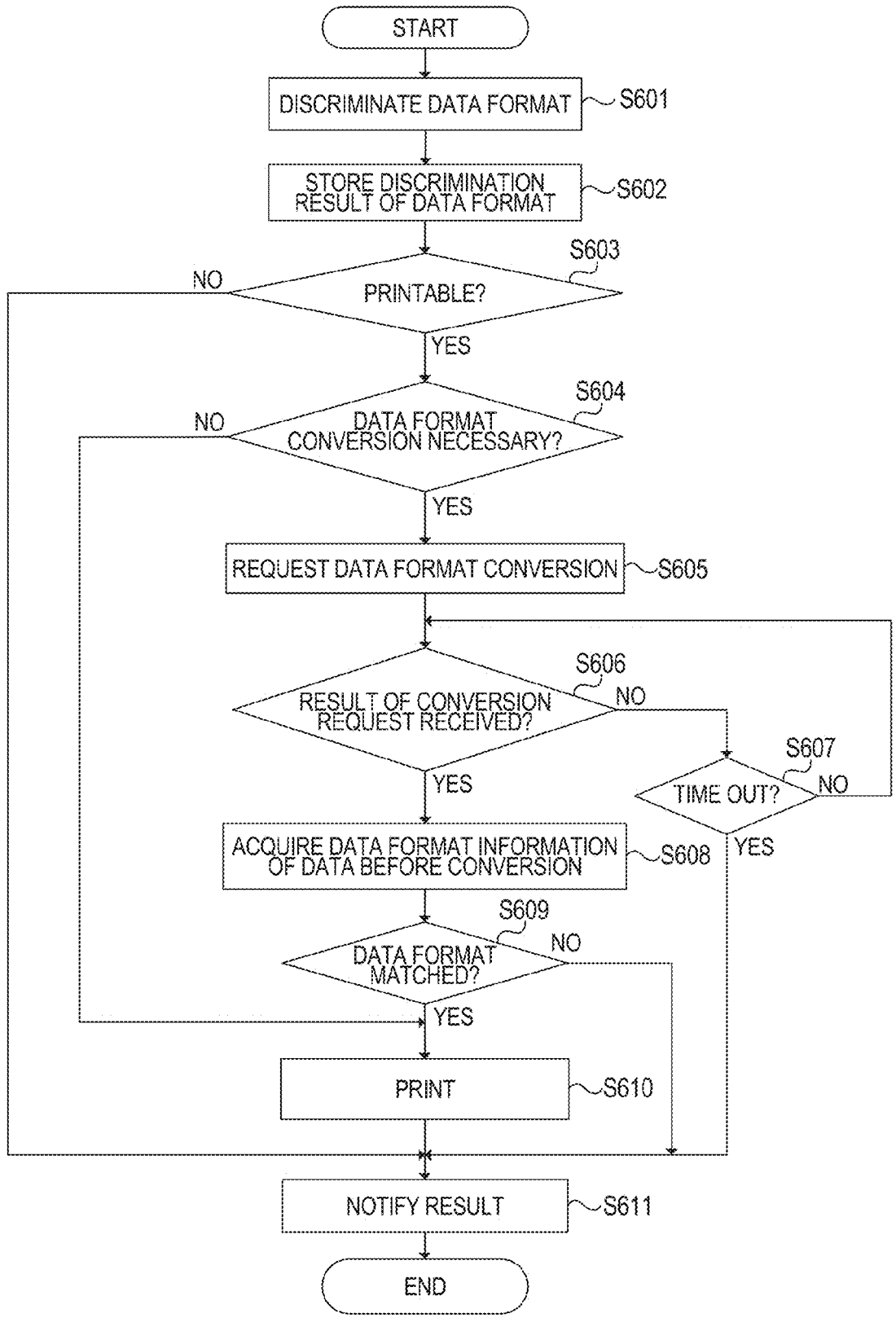
FIG. 6 is a flowchart for describing a second example of a processing at the time of printing data.

FIG. 6 is a flowchart for describing an example of a data processing in the case where the data print application 300 prints the print-requested data. In the description of the flowchart of FIG. 6, a case of printing application data of which the printing was requested from the information terminal 140 will be described as an example.

First, in step S601, when the data print application 300 receives the print request, the control unit 301 requests a discrimination of the data format to the data format discriminating unit 302. Prior to such a request, the control unit 301 obtains the application data received from the information terminal 140 and the print request information added to the application data. The data format discriminating unit 302 obtains the data format information from the print request information obtained by the control unit 301 and discriminates the data format of the print-requested data. If the print request information could not be obtained or if the data format information is not added to the print request information, the data format discriminating unit 302 analyzes the head portion of the print-requested data and discriminates the data format.

Subsequently, in step S602, the control unit 301 stores the data format discriminated in step S601 into a temporary storage area. The temporary storage area is, for example, the RAM 203 or HDD 205. If the data format could not be discriminated in step S601, the subsequent processings are similar to those in the case where the data format could not be discriminated in step S401 in FIG. 4 in the first embodiment.

Since processings in steps S603 to S608 are substantially the same as those in steps S402 to S407 described in the first embodiment, their detailed description is omitted.

If the data format information showing the data format of the data before the conversion which was discriminated in the data conversion apparatus 120 is obtained in step S608, step S609 follows. The data conversion apparatus 120 analyzes the head portion of the print-requested data and discriminates the data format. In place of using such a method, the data conversion apparatus 120 may discriminate the data format in a manner similar to that in the information terminal 140. That is, the data conversion apparatus 120 obtains the data format information from the print request information and discriminates the data format of the print-requested data. If the print request information could not be obtained or if the data format information is not added to the print request information, the data conversion apparatus 120 analyzes the head portion of the print-requested data and discriminates the data format.

In step S609, the control unit 301 makes a second determination to determine whether or not the data format stored in step S602 matches the data format obtained in step S608. If the data formats do not match as a result of this determination, the control unit 301 determines that the data whose data format has been converted cannot be printed. Then, step S611 follows and the control unit 301 notifies that the data cannot be printed. The processing routine is finished.

If it is determined in step S609 that the data formats match, the control unit 301 determines that the data whose data format has been converted can be printed. Step S610 follows and the control unit 301 executes the print processing in the digital multi-function apparatus 110 by using the data whose data format has been converted by the data conversion apparatus 120.

Subsequently, in step S611, the control unit 301 notifies the apparatus of the print result. The processing routine is finished.

As mentioned above, in the embodiment, the data format of the print-requested data and "the data format of the data before the conversion" received from the data conversion apparatus 120 are compared, thereby determining whether or not the data whose data format has been converted can be printed. Therefore, if there is an error in the information at the time of requesting or the extension of the data is wrong, control can be made in such a manner that the print request is regarded as an unintended print request and the data cannot be printed irrespective of the license of the digital multi-function apparatus 110.

In the flowchart of FIG. 6, the case of printing the application data of which the printing was requested from the information terminal 140 has been described as an example. However, the data print application 300 can process even data other than the application data of which the printing was requested from the information terminal 140. For example, when the application data stored in the USB memory 150 is printed, it is sufficient that the data print application 300 stores the data obtained from the USB memory 150 into the RAM 203 or HDD 205 and executes a processing similar to that shown in the flowchart of FIG. 6.

(Third Embodiment)

Subsequently, the third embodiment of the invention will be described. The third embodiment is obtained by adding the following construction to the first and second embodiments: that is, such a construction that in the case of executing a predetermined processing different from the printing, whether or not the predetermined processing can be executed to the data whose data format has been converted is determined and, thereafter, the processing is executed. Therefore, in the description of the embodiment, substantially the same portions as those in the first and second embodiments are designated by the same reference numerals as those in FIGS. 1 to 6 and their detailed description is omitted.

The data format information management unit 303 of the data print application 300 manages not only the information (information of the data format which is printable in the digital multi-function apparatus 110) described in the first embodiment but also the information of the data format which can be generated in the digital multi-function apparatus 110. The following three kinds of information is included as information of the data format which can be generated in the digital multi-function apparatus 110. The first information is information of the data format which can be directly subjected to a preview processing by the digital multi-function apparatus 110. The second information is information of the data format which can be preview-processed by the digital multi-function apparatus 110 by converting the data format by the data conversion apparatus 120. The third information is information of the data format which can be processed by the data conversion apparatus 120.

The data format in the second information is, for example, the following two data formats. The first data format is a data format of the application set as a software license to the digital multi-function apparatus 110 and is a data format of the application which can be subjected to the print processing in the digital multi-function apparatus 110. The second data format is a data format of the application set as a software license to the digital multi-function apparatus 110 and is a data format of the application which can be subjected to the generating processing of the image data in the digital multi-function apparatus 110. The generating processing of the image data denotes, for example, a processing for generating a file such as JPEG data, PDF data, or the like.

Figure 7:
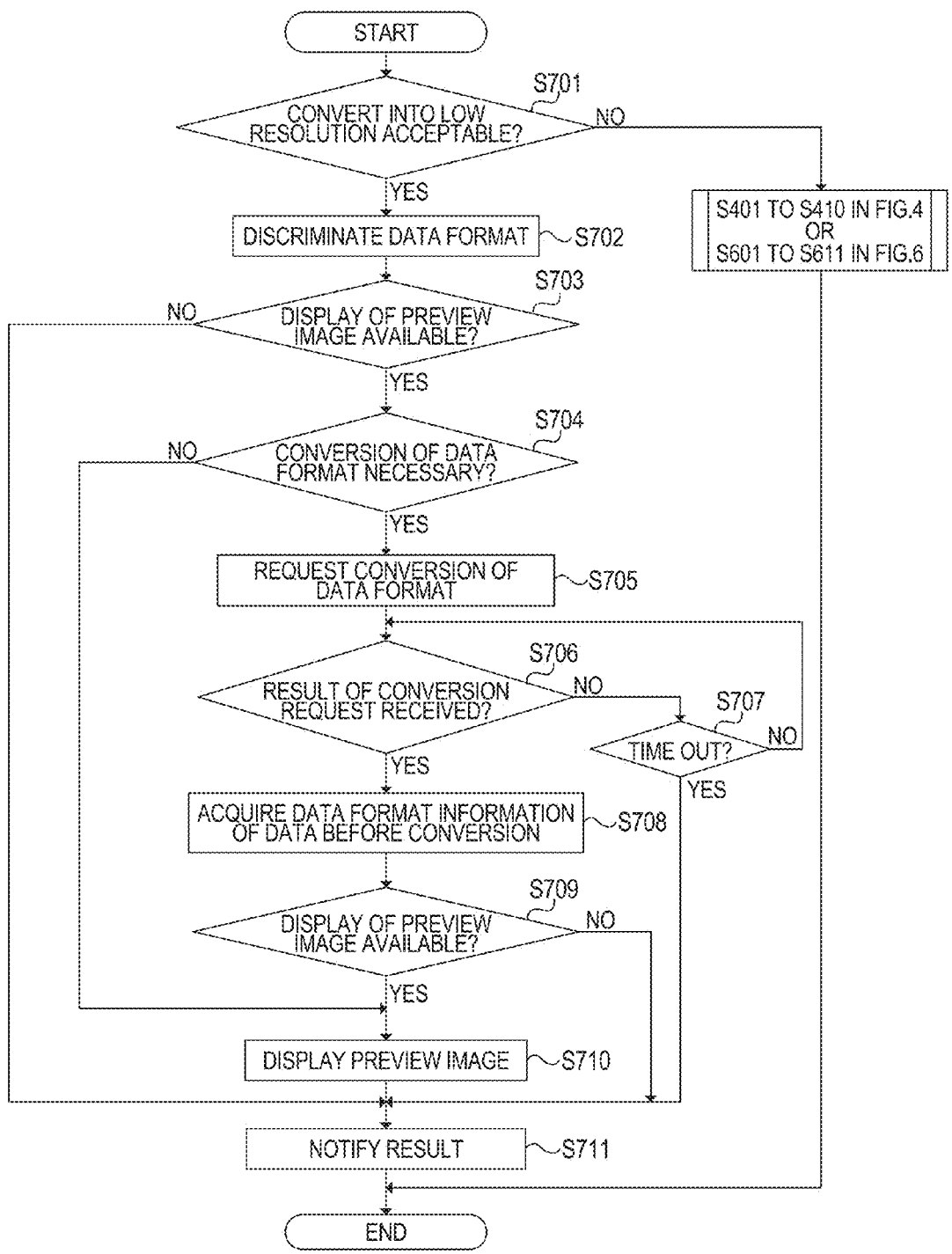
FIG. 7 is a flowchart for describing a processing at the time of executing a preview processing.

FIG. 7 is a flowchart for describing an example of a data processing at the time when the data print application 300 executes a preview processing of the instructed data.

First, in step S701, the control unit 301 makes a third determination to determine whether or not a conversion processing into a data format of a resolution lower than a predetermined resolution may be executed. When the request to the data print application 300 is not the printing but the preview processing of the application, the control unit 301 determines that the conversion processing into the data format of the low resolution may be executed. On the other hand, if the request to the data print application 300 is the printing, the control unit 301 determines that the conversion processing into the data format of the low resolution should not be executed. In this case, the processing of the data print application 300 described in the first or second embodiment is executed (refer to steps S401 to S410 in FIG. 4 or steps S601 to S611 in FIG. 6).

If the conversion processing into the data format of the low resolution may be executed as a result of the determination in step S701, step S702 follows. In step S702, the data format discriminating unit 302 discriminates a data format of the data of which the preview processing has been requested. Since a method of discriminates the data format is substantially the same as that described in step S401 in FIG. 4 or step S601 in FIG. 6, its detailed description is omitted here.

Subsequently, in step S703, the control unit 301 obtains the information of the data format discriminated by the data format discriminating unit 302 in step S702. The control unit 301 also obtains the information (the foregoing first to third information) of the data format which can be generated in the digital multi-function apparatus 110. Then, the control unit 301 determines whether or not a preview display can be performed. By using the foregoing first to third information obtained from the data format information management unit 303, the control unit 301 determines whether or not a preview image of the data of the data format discriminated by the data format discriminating unit 302 in step S702 can be displayed.

Specifically speaking, in a manner similar to the determination of step S402 in FIG. 4, in one of the following two cases, it is determined that the preview display of the data of the data format discriminated by the data format discriminating unit 302 can be performed. First, there is a case where the data format discriminated by the data format discriminating unit 302 is included in the data format which can be directly subjected to the preview processing by the digital multi-function apparatus 110. Second, there is a case where the data format discriminated by the data format discriminating unit 302 is included in both of the data format which can be subjected to the preview processing by the digital multi-function apparatus 110 by converting the data format by the data conversion apparatus 120 and the data format which can be processed by the data conversion apparatus 120.

As a result of the determination of step S703, if the preview image of the data of the data format discriminated by the data format discriminating unit 302 in step S702 can be displayed, step S704 follows. Since processings in steps S704 to S708 are similar to those in steps S403 to S407, their detailed description is omitted. However, in step S705, the conversion request of the data format to the data conversion apparatus 120 by the communication control unit 304 is a conversion request to the data format of the low resolution.

If the data format information showing the data format of the data before the conversion is obtained in step S708, step S709 follows. In step S709, the control unit 301 makes a second determination to determine whether or not the preview image of the data whose data format has been converted can be displayed. Specifically speaking, the control unit 301 obtains, from the data format information management unit 303, a data format (the foregoing second information) of an application in which a software license of each of the print processing and the generating processing of the image data has been set. When the data format obtained in step S708 is included in at least one of the data formats obtained from the data format information management unit 303, the control unit 301 determines that the preview image of the data whose data format has been converted can be displayed.

If the preview image of the data whose data format has been converted can be displayed as a result of the determination in step S708, step S710 follows. In step S710, the control unit 301 outputs the preview image and instructs a display of the preview image. Thus, the preview image is displayed. In step S711, the control unit 301 notifies the apparatus of a result of the display of the preview image. The processing routine is finished.

As mentioned above, in the embodiment, when the data format is converted into the data format of the low resolution, since the data of the low resolution is not suitable to print, the permission or inhibition of the processing is discriminated also in consideration of a license of a processing other than the printing. Therefore, even in the unprintable data format, the preview image of the data generated by the digital multi-function apparatus 110 can be displayed.

In the embodiment, as a processing other than the printing, the case of setting the license about the generating processing of the image data has been described as an example. However, in place of the data format in which the generating processing of the image data can be executed, the license about another processing such as a data format which can be subjected to the display processing of the preview image or the like may be set. The data format is not limited to the data format in which the license has been set. If the digital multi-function apparatus 110 can identify a data format which can be handled by the processing other than the printing, it is not always necessary that the license has been set.

In the embodiment, in step S709, whether or not the data format obtained in step S708 is included in at least one of the data formats obtained from the data format information management unit 303 is determined. However, it is not always necessary to make such a discrimination. For example, in a manner similar to the second embodiment, the data format discriminated in step S702 is held and whether or not the held data format matches the data format obtained in step S708 may be determined in step S709.

(Fourth Embodiment)

Subsequently, the fourth embodiment of the invention will be described. In the first to third embodiments, the case where whether or not a processing of the data whose data format was converted (printing or display of the preview image) can be executed is discriminated by the digital multi-function apparatus 110 has been described as an example. On the other hand, in the fourth embodiment, prior to converting the data format, whether or not the conversion of the data format can be performed is discriminated by the data conversion apparatus 120 and whether or not the processing of the data whose data format was converted can be executed is discriminated. In this manner, the fourth embodiment differs from the first to third embodiments mainly with respect to a method of discriminating whether or not the processing of the data whose data format was converted can be executed. Therefore, in the description of the embodiment, substantially the same portions as those in the first to third embodiments are designated by the same reference numerals as those in FIGS. 1 to 7 and their detailed description is omitted.

Figure 8:
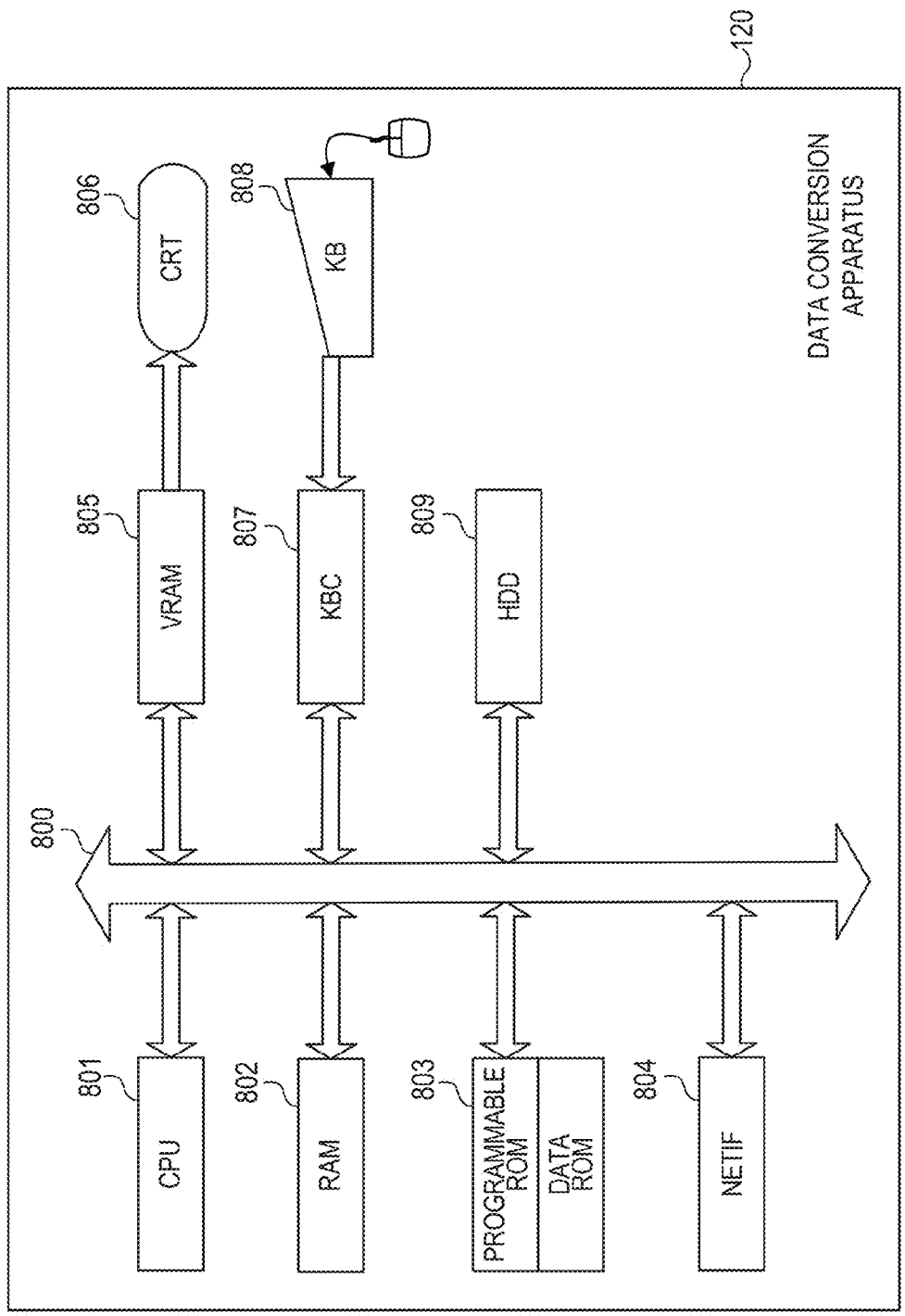
FIG. 8 is a diagram illustrating a construction of hardware of a data conversion apparatus.

FIG. 8 is a block diagram illustrating an example of a construction of hardware of the data conversion apparatus 120. The data conversion apparatus 120 in the first to third embodiments can be also realized by the construction illustrated in FIG. 8.

In FIG. 8, a CPU 801 executes an arithmetic operation of the data conversion apparatus 120 and controls it. A RAM 802 functions as a main memory of the CPU 801 and also functions as an area of a program and an execution area and a data area of the program.

An operation processing procedure of the CPU 801 has been stored in a ROM 803. The ROM 803 has: a programmable ROM in which fundamental software (OS) serving as a system program to control the data conversion apparatus 120 has been recorded; and a data ROM in which information necessary to make the system operative and the like have been recorded. There is also a case of using an HDD 809, which will be described hereinafter, in place of the ROM 803.

An NETIF 804 is a network interface and makes control to transfer data to/from the digital multi-function apparatus 110 through the network 100, or the like. A VRAM (video RAM) 805 develops an image to be displayed onto a display screen of a CRT 806 such as an image showing an operation state of the data conversion apparatus 120 or the like and controls its display.

The CRT 806 is a display apparatus such as a display or the like. A KBC 807 is a controller to control an input signal from a KB 808. The KB 808 is an external input apparatus to receive the operation which is executed by the user. As a KB 808, for example, a pointing device such as keyboard, mouse, or the like is used.

The HDD 809 is a hard disk drive and is used to store an application program and various kinds of data. The application program in the embodiment is a software program to execute various kinds of processing units in the embodiment, or the like.

Figure 9:
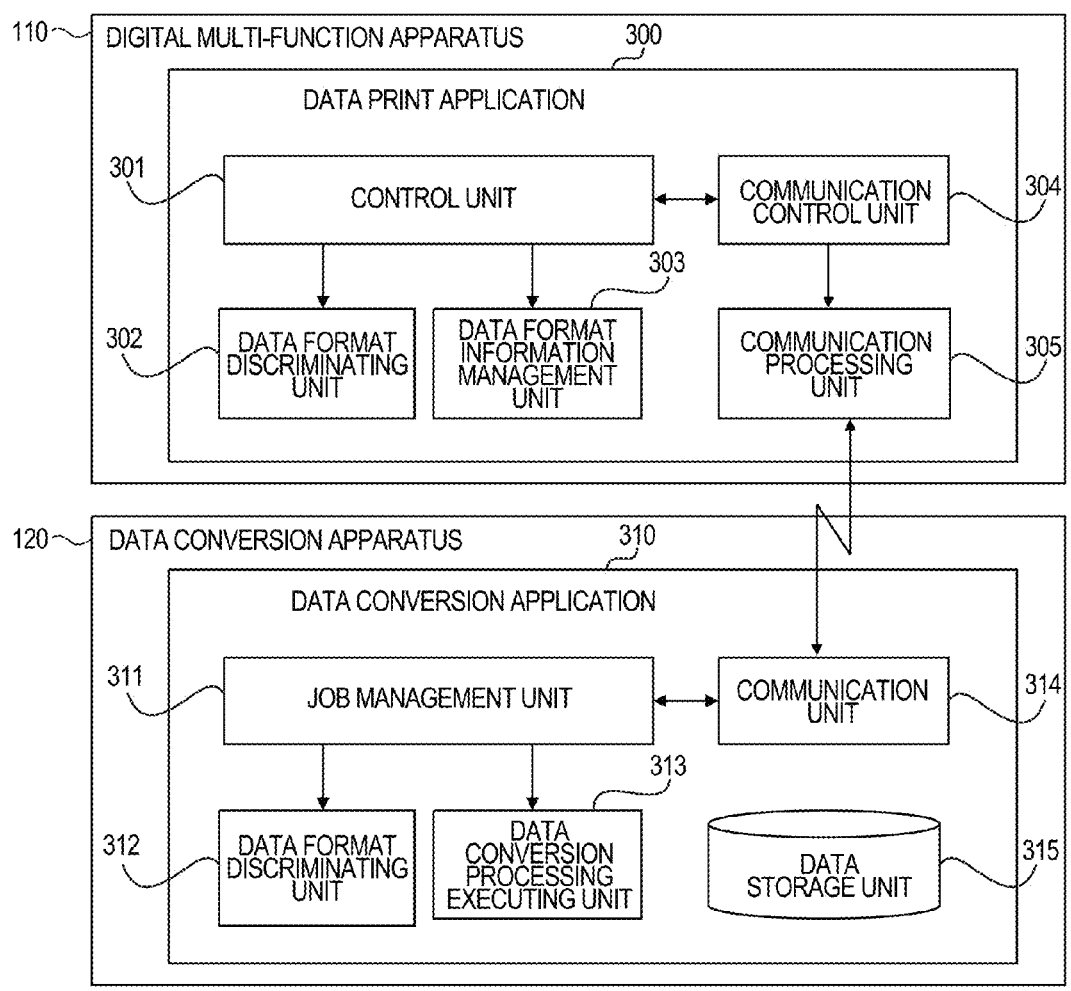

FIG. 9 is a block diagram illustrating an example of a functional construction of a data print application program which operates in the digital multi-function apparatus 110 (external apparatus) and a data conversion application program which operates in the data conversion apparatus 120 (information processing apparatus).

The data conversion application 310 has a job management unit 311, a data format discriminating unit 312, a data conversion processing executing unit 313, a communication unit 314, and a data storage unit 315.

The communication unit 314 receives the conversion request of the data format from the digital multi-function apparatus 110 and transmits conversion result information showing a result to the conversion request of the data format (data whose data format has been converted and data format information showing the data format before the conversion).

The job management unit 311 manages the conversion request of the data format received by the communication unit 314 as a conversion job. The data format discriminating unit 312 discriminates the data format received from the job management unit 311. The data conversion processing executing unit 313 executes the conversion processing of the data format. The data storage unit 315 stores the received data, the data whose data format has been converted, and the information of the digital multi-function apparatus 110. The data storage unit 315 is realized by the RAM 802 or HDD 809. The communication unit 314 receives the conversion request of the data format from the communication processing unit 305 in the digital multi-function apparatus 110. The job management unit 311 registers the conversion request, as a conversion job, of the data format received by the communication unit 314.

The data format discriminating unit 312 discriminates the data format of the data of which the data conversion application 310 received the request of the conversion (conversion request). The discrimination of the data format is executed by, for example, analyzing the data. The data format of the application which has been set as a software license or processing ability of the digital multi-function apparatus 110 and which can execute the processing such as print processing, generating processing of the image data, or the like is included in the information of the digital multi-function apparatus 110 held in the data storage unit 315.

The data conversion application 310 is stored into any one of the storage units such as RAM 802, HDD 809, and ROM 803 and is executed by the CPU 801.

Figure 10:
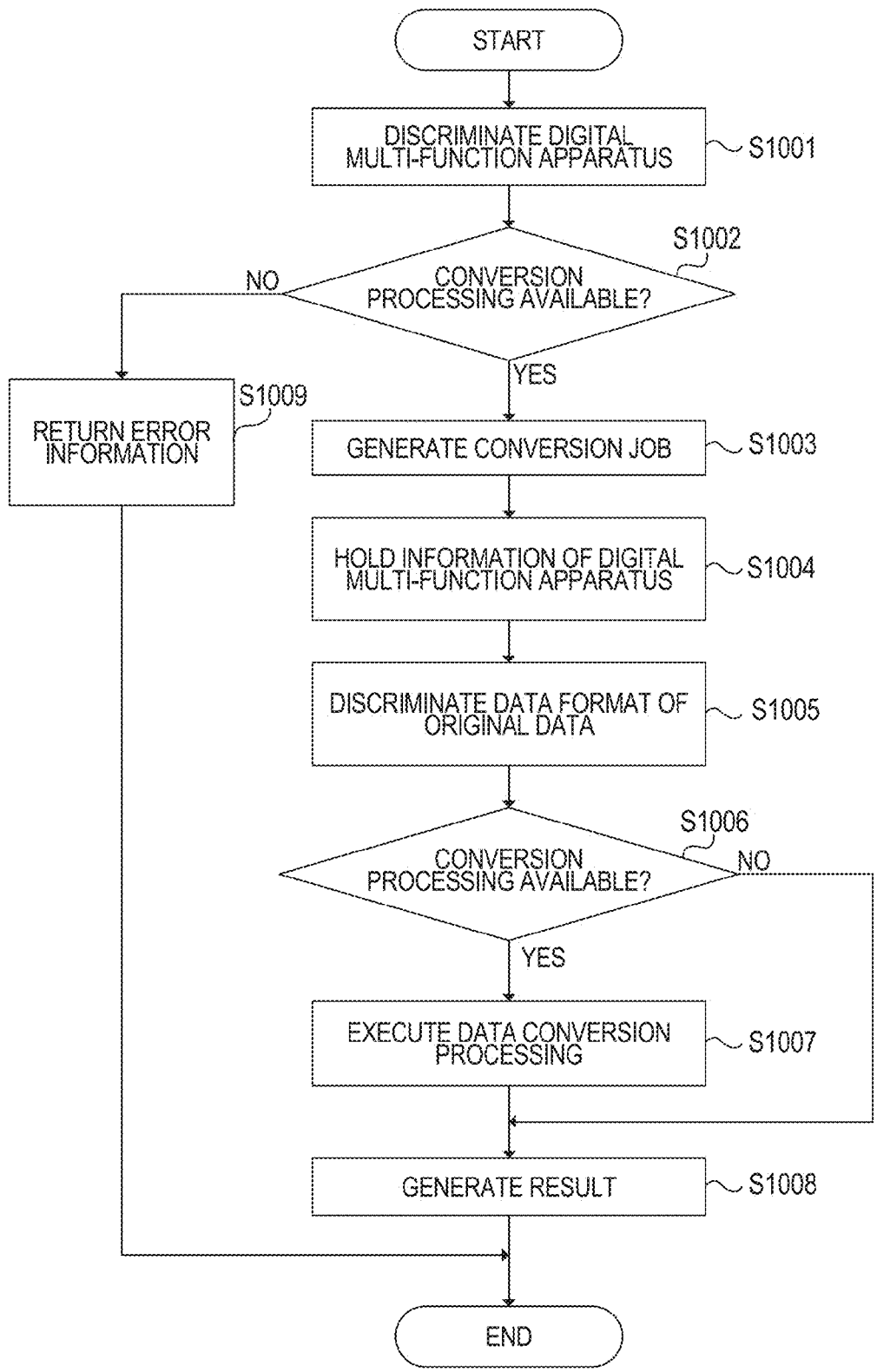
FIG. 10 is a flowchart for describing a processing at the time of executing a conversion of a data format.

FIG. 10 is a flowchart for describing an example of a data processing at the time when the data conversion application 310 executes the conversion of the data format.

When the communication unit 314 receives the conversion request of the data format from the digital multi-function apparatus 110, the processing according to the flowchart of FIG. 10 is started. First, in step S1001, the communication unit 314 discriminates which one of the apparatuses the digital multi-function apparatus 110 on a requesting source side is. Such a discrimination can be realized by, for example, collating an ID to identify the digital multi-function apparatus included in the conversion request of the data format and an ID which has previously been stored in the data storage unit 315.

Subsequently, in step S1002, the communication unit 314 makes a second determination to determine whether or not the data format can be converted. Such a determination can be made, for example, by the following method.

First, whether or not the digital multi-function apparatus 110 discriminated in step S1001 is a digital multi-function apparatus which can use the data conversion apparatus 120 is determined. Information adapted to discriminate the digital multi-function apparatus which can use the data conversion apparatus 120 may be stored in the data storage unit 315 or may be managed by an authentication server or the like different from the data conversion apparatus 120. Further, the communication unit 314 also determines whether or not the contents of the conversion request of the data format from the digital multi-function apparatus 110 can be processed in the data conversion apparatus 120. If it is determined that the digital multi-function apparatus 110 on the requesting source side does not have a use authority of the data conversion apparatus 120 or if it is determined that the contents of the conversion request of the data format cannot be processed in the data conversion apparatus 120, step S1009 follows. In step S1009, the communication unit 314 returns error information to the digital multi-function apparatus 110 which made the conversion request of the data format. The processing routine is finished.

As a result of the determination in step S1002, if the digital multi-function apparatus 110 discriminated in step S1001 is the digital multi-function apparatus which can use the data conversion apparatus 120, step S1003 follows. In step S1003, the communication unit 314 notifies the job management unit 311 of the contents of the conversion request of the data format as a conversion job, and instructs a generation of the conversion job. The job management unit 311 holds identifier information of the generated conversion job into the data storage unit 315. The communication unit 314 returns the identifier information of the conversion job to the digital multi-function apparatus 110.

The communication unit 314 receives the information regarding the data format of the application which has been set as a software license to the digital multi-function apparatus 110 and can execute the processing such as print processing, generating processing of the image data, or the like. In step S1004, the communication unit 314 holds such information into the data storage unit 315.

Subsequently, in step S1005, the data format discriminating unit 312 discriminates the data format of the original data of the conversion job. In this instance, by analyzing the contents of the data and discriminating that the data is data of which application, the data format of the original data of the conversion job is discriminated. However, the data format discriminating unit 312 may discriminate the data format from the extension information of the data or the data format information added to the print request information described in the first to third embodiments. In the case of using the data format information, for example, when the conversion of the data format is requested, the digital multi-function apparatus 110 transmits the data format information to the data conversion apparatus 120. In a manner similar to the case of discriminating the data format in the first to third embodiments, the data format may be discriminated by combining the method of discriminating the data format by analyzing the data and the method of discriminating the data format from the extension information of the data or the data format information.

Subsequently, in step S1006, the job management unit 311 obtains the data format discriminated in step S1005 and makes a first determination to determine whether or not the conversion processing of the data format can be executed. Such a determination can be made by the following method. First, the job management unit 311 discriminates whether or not the data format discriminated in step S1005 is included in the information stored in the data storage unit 315 in step S1004 (data format of the application which can be processed in the digital multi-function apparatus 110). Further, the job management unit 311 also determines whether or not the data format can be processed in the data conversion processing executing unit 313.

As a result of such a determination, if the data format of the original data of the conversion job is not included in the data format of the application which can be processed in the digital multi-function apparatus 110 or if it is a data format which cannot be processed in the data conversion processing executing unit 313, step S1008 follows. In step S1008, the job management unit 311 generates error information as a result of the conversion request of the data format.

If the conversion processing of the data format can be executed as a result of the discrimination in step S1006, step S1007 follows. In step S1007, the data conversion processing executing unit 313 executes the data conversion processing to convert the data format of the data of which the conversion of the data format has been requested.

After completion of the data conversion processing in the data conversion processing executing unit 313, in step S1008, the job management unit 311 generates conversion result information including the data whose data format has been converted and the data format information showing the data format of the data on the converting source side.

When the identifier information of the conversion job returned in step S1003 is received, the digital multi-function apparatus 110 makes a request to obtain the data whose data format has been converted. When the obtaining request is received, the communication unit 314 transmits the conversion result information generated in step S1008 or the error information to the digital multi-function apparatus 110 as a reply to the obtaining request of the data whose data format has been converted.

For example, the following processings are executed in place of steps S405 and S406 in FIG. 4, steps S606 and S607 in FIG. 6, and steps S706 and S707 in FIG. 7.

The communication control unit 304 determines whether or not the identifier information of the conversion job has been received. As a result of the determination, if the identifier information of the conversion job is not received, the communication control unit 304 determines whether or not the error information has been received. The error information is returned in step S1009 in FIG. 10. As a result of the determination, if the error information is not received, the presence or absence of the reception of the identifier information of the conversion job mentioned above is determined again. If the error information has been received, the processing routine advances to step S410, S611, or S711 and the control unit 301 notifies that the processing (printing or display of the preview image) cannot be performed. If the time-out occurred without receiving the identifier information of the conversion job or the error information, the processing routine may advance to step S410, S611, or S711.

For example, in the foregoing processing, if the identifier information of the conversion job has been received, the following processings are executed in place of steps S407 and S408 in FIG. 4, steps S608 and S609 in FIG. 6, and steps S708 and S709 in FIG. 7.

The communication control unit 304 sends the obtaining request of the data whose data format has been converted to the data conversion apparatus 120 through the communication processing unit 305 and the network 100. Further, the communication control unit 304 determines whether or not the conversion result information or the error information has been received. As a result of the determination, if the conversion result information has been received, step S409, S610, or S710 follows and the control unit 301 executes the processing (printing or display of the preview image). If the error information has been received, step S409, S610, or S710 is omitted and the processing routine advances to step S410, S611, or S711. The control unit 301 notifies that the processing (printing or display of the preview image) cannot be performed. If the time-out occurred without receiving the conversion result information or the error information, step S409, S610, or S710 may be omitted and the processing routine may advance to step S410, S611, or S711.

Since processings other than the foregoing processings are substantially the same as those described with reference to, for example, the flowcharts of FIGS. 4, 6, and 7, their detailed description is omitted here.

As mentioned above, in the embodiment, the data format of the application which can be processed in the digital multi-function apparatus 110 is held in the data conversion apparatus 120 and whether or not the data conversion processing can be executed is discriminated in the data conversion apparatus 120. Therefore, prior to executing the conversion of the data format, the permission or inhibition of the conversion can be discriminated. Thus, the execution of the wasteful data conversion processing can be suppressed. After the data conversion processing was executed, a fact that the data after the data conversion processing cannot be processed can be discriminated by the digital multi-function apparatus 110 earlier than the timing when the result of the data conversion processing is obtained and the permission or inhibition of the data conversion processing is discriminated. Consequently, the error can be displayed earlier.

In the embodiment, when the conversion of the data format is requested, the data conversion apparatus 120 receives the information regarding the data format of the application which has been set as a software license to the digital multi-function apparatus 110 and can execute the processing such as print processing, generating processing of the image data, or the like. However, the timing when the data conversion apparatus 120 receives such information may be another timing. For example, when a change occurs in the data format which can be processed by the digital multi-function apparatus 110, the information regarding the data format may be notified to the data conversion apparatus 120. The data conversion apparatus 120 may hold the information regarding the data format which can be processed may be held every digital multi-function apparatus 110.

In the embodiment, as a reply to the request for the conversion of the data format, after the identifier information of the conversion job was returned to the digital multi-function apparatus 110, the conversion result information is returned as a reply to the obtaining request of the data from the digital multi-function apparatus 110. However, it is not always necessary to use the identifier information of the conversion job. For example, when the data conversion apparatus 120 receives the conversion request of the data format from the digital multi-function apparatus 110, the data conversion processing is soon executed and when the conversion result information is generated, the conversion result information may be returned to the digital multi-function apparatus 110 as a reply to the conversion request of the data format.

The foregoing embodiments are nothing but the specific examples when embodying the invention, and the technical scope of the invention should not be limitatively interpreted by them. That is, the invention can be embodied in various forms without departing from its technical idea or its principal feature.

According to the above-described embodiments, the information processing apparatus which cannot execute a predetermined processing can discriminate whether or not the predetermined processing may be executed to document data converted so that the predetermined processing can be executed.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-235075, filed Nov. 13, 2013, which is hereby incorporated by reference herein in its entirety.

What is claimed is:

1. An information processing apparatus comprising at least one processor and at least one memory coupled to the at least one processor, the at least one processor and the at least one memory functioning as:
   a first receiving unit configured to receive a processing request for execution of processing of document data;
   an acquiring unit configured to acquire the document data;
   a first determining unit configured to determine whether the information processing apparatus can execute the requested processing of the acquired document data, if the first receiving unit receives the processing request;
   a requesting unit configured to send, to an external apparatus, a conversion request to convert the acquired document data into converted data by converting a format of the acquired document data, if the first determining unit determines that the information processing apparatus cannot execute the requested processing of the acquired document data, the information processing apparatus being able to execute the requested processing of the converted data;
   a second receiving unit configured to receive, from the external apparatus, the converted data and determination information, as a response to the conversion request sent from the requesting unit, the determination information including at least one of information specifying an application corresponding to a data format of the acquired document data before being converted and information of a determination result by the external apparatus about whether the data format of the acquired document data before being converted is a data format of an application of which a software license is set to the information processing apparatus;
   a second determining unit configured to determine, based on the determination information received from the external apparatus, whether the data format of the acquired document data before being converted is the data format of the application of which a software license is set to the information processing apparatus; and
   an execution unit configured to execute, in response to the processing request, if the second determining unit determines that the data format of the acquired document data before being converted is the data format of the application of which the software license is set to the information processing apparatus, the requested processing of the converted data received from the external apparatus, and not to execute, in response to the processing request, if the second determining unit determines that the data format of the acquired document data before being converted is not the data format of the application of which the software license is set to the information processing apparatus, the requested processing of the converted data.

2. The information processing apparatus according to claim 1, wherein the requested processing of the document data is print processing of the document data or preview processing of the document data.

3. The information processing apparatus according to claim 1, wherein the determination information includes, as the information specifying an application corresponding to the data format of the acquired document data before being converted, at least one of information of the data format of the acquired document data before being converted and information of the application corresponding to the data format of the acquired document data before being converted.

4. The information processing apparatus according to claim 1, wherein the at least one processor and the at least one memory further function as:
a storage control unit configured to store, in a storage unit, information of a first data format which is determined by the information processing apparatus as the data format of the acquired document data before being converted,
wherein the second receiving unit is configured to receive information of second data format which is determined by the external apparatus as the data format of the acquired document data before being converted, and
the second determining unit is configured to determine whether the second data format matches the first data format; and
an execution unit configured to execute, in response to the processing request, if the second determination unit determines that the second data format matches the first data format, the requested processing of the converted data received from the external apparatus, and not to execute, in response to the processing request, if the second determination unit determines that the second data format does not match the first data format, the requested processing of the converted data.

5. The information processing apparatus according to claim 1, wherein the at least one processor and the at least one memory further function as:
a removing unit configured to remove the converted data received by the second receiving unit, if the second determining unit determines that the data format of the acquired document data before being converted is not the data format of an application of which the software license is set to the information processing apparatus.

6. The information processing apparatus according to claim 1, wherein the first determining unit determines whether the document data before being converted can be subjected to the requested processing, and whether the document data, if converted, can be subjected to the requested processing.

7. The information processing apparatus according to claim 1, wherein the at least one processor and the at least one memory further function as:
a third determining unit configured to determine whether a resolution of the converted data is higher than a predetermined resolution,
wherein the requested processing is print processing, and
wherein the print processing is performed when the third determining unit determines that the resolution of the converted data is higher than the predetermined resolution, and the print processing is not performed when the third determining unit determines that the resolution of the converted document data is not higher than the predetermined resolution.

8. An information processing system including an information processing apparatus and an external apparatus, comprising at least one processor and at least one memory coupled to the at least one processor, the at least one processor and the at least one memory functioning as:
a first receiving unit configured to receive a processing request for execution of processing of document data;
an acquiring unit configured to acquire the document data;
a first determining unit configured to determine whether the information processing apparatus can execute the requested processing of the acquired document data, if the first receiving unit receives the processing request;
a requesting unit configured to send, to the external apparatus, a conversion request to convert the acquired document data into converted data by converting a format of the acquired document data, if the first determining unit determines that the information processing apparatus cannot execute the requested processing of the acquired document data, the information processing apparatus being able to execute the requested processing of the converted data;
a second receiving unit configured to receive, from the external apparatus, the converted data and determination information, as a response to the conversion request sent from the requesting unit, the determination information including at least one of information specifying an application corresponding to the data format of the acquired document data before being converted and information of determination result by the external apparatus about whether the data format of the acquired document data before being converted is a data format of an application of which a software license is set to the information processing apparatus;
a second determining unit configured to determine, based on the determination information received from the external apparatus, whether a data format of the acquired document data before being converted is the data format of the application of which a software license is set to the information processing apparatus; and
an execution unit configured to execute, in response to the processing request, if the second determining unit determines that the data format of the acquired document data before being converted is the data format of the application of which the software license is set to the information processing apparatus, the requested processing of the converted data received from the external apparatus, and not to execute, in response to the processing request, if the second determining unit determines that the data format of the acquired document data before being converted is not the data format of the application of which the software license is set to the information processing apparatus, the requested processing of the converted data.

9. A method for controlling an information processing apparatus, the method comprising:
receiving a processing request for execution of processing of document data;
acquiring the document data;
determining whether the information processing apparatus can execute the requested processing of the acquired document data, if the processing request is received;
sending, to an external apparatus, a conversion request to convert the acquired document data into converted data by converting a format of the acquired document data, if it is determined that the information processing apparatus cannot execute the requested processing of the acquired document data, the information processing apparatus being able to execute the requested processing of the converted data;
receiving, from the external apparatus, the converted data and determination information, as a response to the conversion request, the determination information including at least one of information specifying an application corresponding to a data format of the acquired document data before being converted and information of a determination result by the external apparatus about whether the data format of the acquired document data before being converted is a data format of an application of which a software license is set to the information processing apparatus;

determining, based on the determination information received from the external apparatus, whether a data format of the acquired document data before being converted is the data format of the application of which a software license is set to the information processing apparatus; and executing, in response to the processing request, if it is determined that the data format of the acquired document data before being converted is the data format of the application of which the software license is set to the information processing apparatus, the requested processing of the converted data received from the external apparatus, and not executing, in response to the processing request, if it is determined that the data format of the acquired document data before being converted is not the data format of the application of which the software license is set to the information processing apparatus, the requested processing of the converted data.

10. A non-transitory computer-readable storage medium storing a computer program for operating a computer to execute a data processing method comprising:

receiving a processing request for execution of processing of document data;

acquiring the document data;

determining whether an information processing apparatus can execute the requested processing of the acquired document data, if the processing request is received;

sending, to an external apparatus, a conversion request to convert the acquired document data into converted data by converting a format of the acquired document data, if it is determined that the information processing apparatus cannot execute the requested processing of the acquired document data, the information processing apparatus being able to execute the requested processing of the converted data;

receiving, from the external apparatus, the converted data and determination information, as a response to the conversion request, the determination information including at least one of information specifying an application corresponding to a data format of the acquired document data before being converted and information of a determination result by the external apparatus about whether the data format of the acquired document data before being converted is a data format of an application of which a software license is set to the information processing apparatus;

determining, based on the determination information received from the external apparatus, whether the data format of the acquired document data before being converted is the data format of an application of which a software license is set to the information processing apparatus; and executing, in response to the processing request, if it is determined that the data format of the acquired document data before being converted is the data format of the application of which the software license is set to the information processing apparatus, the requested processing of the converted data received from the external apparatus, and not executing, in response to the processing request, if it is determined that the data format of the acquired document data before being converted is not the data format of the application of which the software license is set to the information processing apparatus, the requested processing of the converted data.

11. An information processing apparatus comprising at least one processor and at least one memory coupled to the at least one processor, the at least one processor and the at least one memory functioning as:

a receiving unit configured to receive a request for execution of processing of document data;

a requesting unit configured to send, to an external apparatus, a conversion request to convert a data format of the document data of which processing is requested, the external apparatus converting the data format of the document data from a first data format to a second data format according to the conversion request;

an acquiring unit configured to acquire, from the external apparatus, data format information indicating the first data format of the document data of which processing is requested and the document data in the second data format, wherein the first data format of the document data is identified by the external apparatus; and an executing unit configured to execute, if the data format information indicates that the first data format of the document data of which processing is requested is a data format of an application of which a software license is set to the information processing apparatus, the requested processing of the document data in the second data format, and not to execute, if the data format information indicates that the first data format of the document data of which processing is requested is not the data format of the application of which the software license is set to the information processing apparatus, the requested processing.

12. The information processing apparatus according to claim 11, wherein the at least one processor and the at least one memory further function as:

an acquisition unit configured to acquire the document data from a Universal Serial Bus (USB) memory.

13. The information processing apparatus according to claim 11, the at least one processor and the at least one memory further functioning as:

a determination unit configured to determine whether the first data format of the document data of which processing is requested is a data format of an application of which a software license is set to the information processing apparatus, wherein the determination unit determines, based on the data format information, whether the first data format of the document data of which processing is requested is a data format of an application of which a software license is set to the information processing apparatus, and wherein whether the execution unit executes the processing of the document data is determined based on the result of a determination by the determination unit.

14. A method for controlling an information processing apparatus, the method comprising:

receiving a request for execution of processing of document data;

requesting, to an external apparatus, converting a data format of the document data of which processing is requested, the external apparatus converting the data format of the document data from a first data format to a second data format according to a request in the requesting;

acquiring, from the external apparatus, data format information indicating the first data format of the document data of which processing is requested and the document data in the second data format, wherein the first data format of the document data is identified by the external apparatus; and executing, if the data format information indicates that the first data format of the document data of which processing is requested is a data format of an application of which a software license is set to the information processing apparatus, the requested processing of the document data in the second data format, and not executing, if the data format information indicates that the first data format of the document data of which processing is requested is not the data format of the application of which the software license is set to the information processing apparatus, the requested processing.

15. A non-transitory computer-readable recording medium storing a readable program for operating a computer to execute a method for controlling an information processing apparatus, the method comprising:

receiving a request for execution of processing of document data;

sending, to an external apparatus, a conversion request to convert a data format of the document data of which processing is requested, the external apparatus converting the data format of the document data from a first data format to a second data format according to the conversion request;

acquiring, from the external apparatus, data format information indicating the first data format of the document data of which processing is requested and the document data in the second data format, wherein the first data format of the document data is identified by the external apparatus; and executing, if the data format information indicates that the first data format of the document data of which processing is requested is a data format of an application of which a software license is set to the information processing apparatus, the requested processing of the document data in the second data format, and not executing, if the data format information indicates that the first data format of the document data of which processing is requested is not the data format of the application of which the software license is set to the information processing apparatus, the requested processing.

* * * * *